United States Patent [19]

Allread

[11] 4,296,914
[45] Oct. 27, 1981

[54] FULL FLOW BREAKAWAY COUPLING

[75] Inventor: Alan R. Allread, Jackson, Mich.

[73] Assignee: Aeroquip Corporation, Jackson, Mich.

[21] Appl. No.: 107,152

[22] Filed: Dec. 26, 1979

[51] Int. Cl.³ .................. F16L 37/22; F16L 37/28
[52] U.S. Cl. .................. 251/149.2; 285/304; 137/614.05
[58] Field of Search ............ 137/614, 614.02, 614.03, 137/614.04, 614.05; 251/149.1, 149.2, 149.6, 149.7; 285/1, 306, 314, 315, 316, 304

[56] References Cited

U.S. PATENT DOCUMENTS

| | | | |
|---|---|---|---|
| 2,463,326 | 3/1949 | Smisko et al. | |
| 2,705,652 | 4/1955 | Kaiser | |
| 2,708,589 | 5/1955 | Masek | 285/315 X |
| 3,032,359 | 5/1962 | Cator | 285/316 X |
| 3,348,575 | 10/1967 | Simak | 285/306 X |
| 4,000,917 | 1/1977 | Poehlmann | 285/316 X |
| 4,007,909 | 2/1977 | Buseth et al. | 251/149.2 |

Primary Examiner—William R. Cline
Attorney, Agent, or Firm—Beaman & Beaman

[57] ABSTRACT

A breakaway fluid coupling characterized by its ability to incorporate automatic uncoupling release mechanism actuated by tension forces within a fitting having unrestricted high flow rate capacities. The coupling parts are interconnected by ball detents positionable by an axially displaceable latching sleeve, and the detents are mounted within an axially displaceable collar biased against movement by tension forces wherein such biasing action, when overcome by tension forces, shifts the collar locating the detents in a release position relative to the latching sleeve to permit automatic uncoupling.

6 Claims, 2 Drawing Figures

FULL FLOW BREAKAWAY COUPLING

BACKGROUND OF THE INVENTION

Breakaway fluid couplings are utilized to protect fluid coupling systems exposed to high tension forces. For instance, breakaway couplings are employed with agricultural implements and fuel tanker trucks wherein the possibility of a vehicle moving away from an implement or tank being serviced by a flexible hose line is possible. In such instance, breakaway fluid couplings are employed to permit the hose line to uncouple upon the hose tension forces reaching a predetermined value, and breakaway couplings normally incorporate self sealing valves which automatically close upon the coupling parts separating.

In the past, breakaway couplings are usually employed with conduits and hose lines of relatively small size having a bore of one inch, or less, and such small couplings normally employ poppet or sleeve valves mounted within the fluid passage which form a restriction to fluid flow. Such restrictions are usually not serious as most breakaway couplings are employed in high pressure hydraulic systems wherein the quantity of fluid being transmitted through the coupling is limited.

It is an object of the invention to provide a breakaway fluid coupling which may be used with large diameter hose or conduits, and wherein the coupling structure permits self sealing valve structure to be employed which is not restrictive to fluid flow through the coupling.

Another object of the invention is to provide a high capacity full flow breakaway coupling wherein the breakaway structure may be incorporated into the general configuration of the coupling parts and does not significantly add to the bulk or radial dimension of the coupling.

Yet another object of the invention is to provide a full flow nonrestrictive breakaway fluid coupling which permits the coupling parts to separate upon a predetermined axial tension force being applied to the coupling parts, and which also permits ready manual operation of the coupling latching mechanism, and yet, high fluid pressures within the coupling do not affect the manual operation of the latching mechanism, and such fluid pressures cannot inadvertently release the latch mechanism.

A coupling in accord with the invention consists of male and female tubular parts which may be mounted upon the end of hose or other fluid conducting structure. Valves are associated with each part, and preferably, the valves are of a pivoted "full flow" type wherein coupling of the valves opens the valve components removing the same from the flow path through the coupling parts wherein the valve adds no restriction to fluid flow through the coupling. In the invention, one of the coupling parts utilizes pivoted valve structure such as disclosed in the assignee's U.S. Pat. No. 4,007,909. A nose extension defined upon the male part engages the pivotal valve portions pivoting the same from the fluid path as the parts are connected.

The coupling utilizes a ball detent type latch system wherein radially movable balls are positioned by a axially displaceable latching sleeve, and selectively maintained within a groove defined in the other part whereby axial displacement of the sleeve between latching and release positions operably engages and disengages the balls from the groove. However, the balls are mounted within an axially displaceable collar defined upon the female part which is biased in a direction opposite to that of tension forces occuring within the coupling, and upon sufficient tension forces being applied to the coupling parts the detent supporting collar is axially displaced relative to the latching sleeve permitting the ball detents to align with the sleeve release recess permitting the detents to be removed from the groove and the coupling parts will separate. Such separation permits the valves of each part to automatically close and prevent spillage.

BRIEF DESCRIPTION OF THE DRAWINGS

The aforementioned objects and advantages of the invention will be appreciated from the following description and accompaying drawings wherein.

DESCRIPTION OF THE PREFERRED EMBODIMENT

Figure 1:
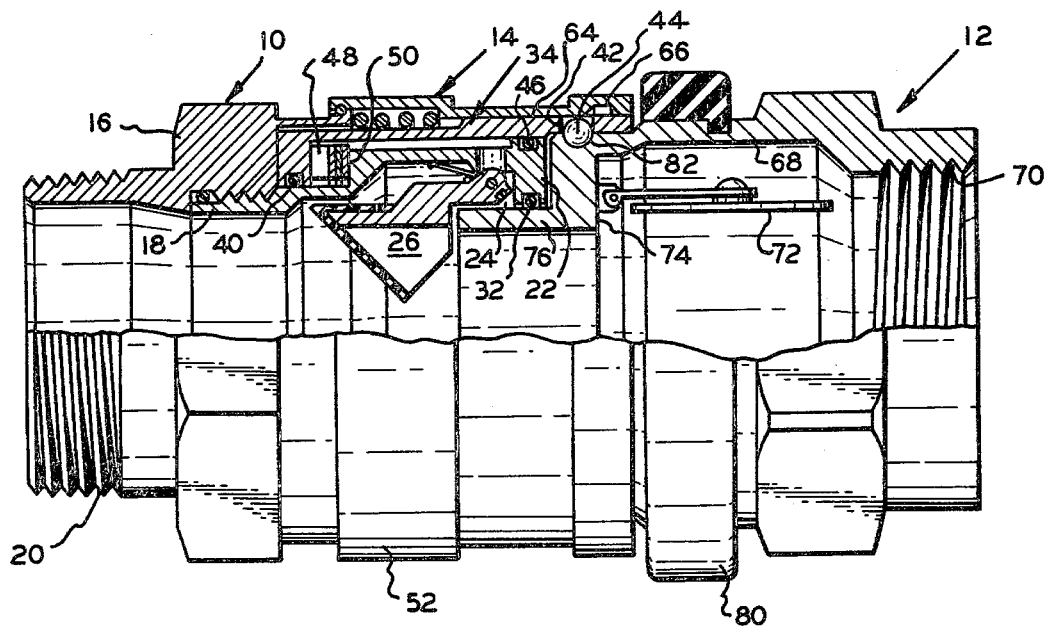
FIG. 1 is an elevational, partially sectioned, view of a breakaway coupling in accord with the invention illustrating the coupling parts interconnected under normal operating conditions.

A breakaway fluid coupling in accord with the concepts of the invention, because of its high flow capacity, concise and economical construction, and dependable operation, is ideally suitable for use in fueling systems for aircraft and ships, and couplings in accord with the invention are capable of handling in excess of 100 gallons per minute flow rate in view of the low flow resistance.

In the disclosed embodiment, the coupling consists of a female part 10 and a male part 12 adapted to be interconnected by latching structure generally indicated at 14. While the disclosed coupling parts are provided with threads for cooperation with typical conduit system structure, such as flexible hose end fittings, it will be appreciated that a coupling part may be provided with flanges, or the like, for mounting a coupling part upon a tank or other fixed conduit component, as is well known in the art.

The female coupling part 10 includes a body 16 of tubular configuration having an axial passage 18 defined therein. The body 16 is exteriorly threaded at 20 for associating the coupling with a conduit system, such as a hose fitting or threaded port, and the body includes a connection end 22 defined by coaxial recess 24.

Self closing valve structure is located within the recess 24, and consists of a pair of "claim shell" valve elements 26, one of which is visible in the drawings, pivotally mounted upon pivot pins 28 supported within the body 16. The particular configuration of the valve elements 26 does not form a part of the instant invention, and this valve structure will be better appreciated from the assignee's U.S. Pat. No. 4,007,909. Each valve element includes a recess 30 for receiving the nose end of the male part 12, as later described, and when the coupling parts are fully interconnected as shown in FIG. 1, the valve elements 26 will be pivoted to their full open position as illustrated wherein the valve elements are completely removed from the coupling flow passage 18 and no flow restriction through the coupling part is present.

The coupling recess 24 is provided with an O-ring 32 mounted within a recess for cooperating with the male part nose to prevent the escape of fluid during opening of the valve elements, and prior to full latching being achieved.

A detent supporting collar 34 of tubular configuration is mounted upon the body 16, and includes an axially extending portion 36, and a radially extending portion 38 which is sealed to the body by O-ring 40. Adjacent the free end of the collar 34 a plurality of radial openings 42 are defined, each of which receives a ball detent 44 which is prevented from complete inward displacement through its opening by the conical configuration of the opening, as is well known. O-ring 46 provides an additional seal between body 16 and collar 34.

Figure 2:
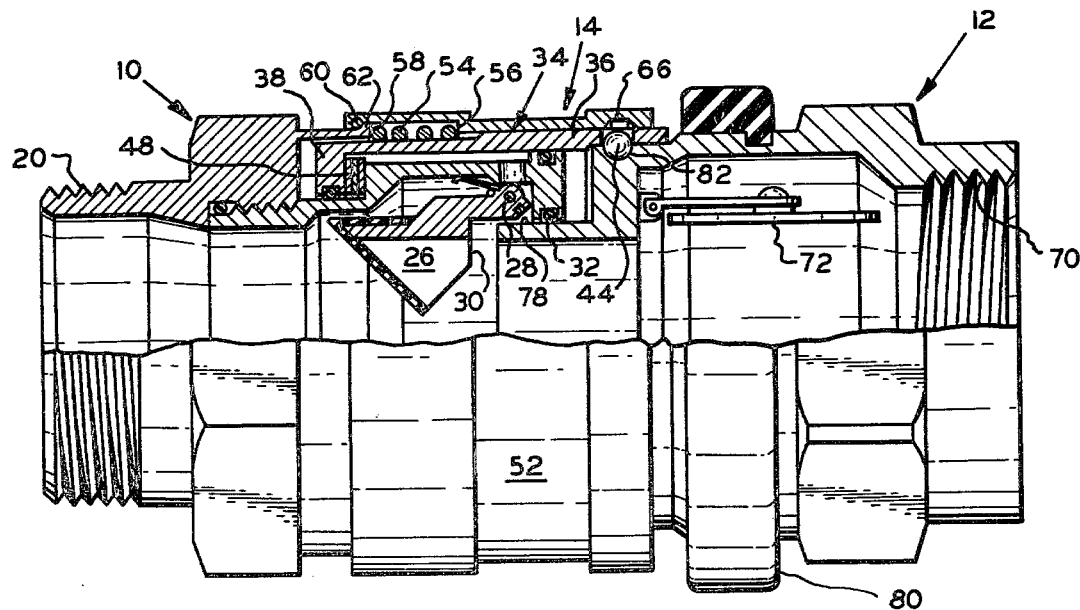
FIG. 2 is an elevational, partially sectioned, view similar to FIG. 1 illustrating the relative position of the coupling components when being separated by tension forces, at the instant of coupling part release and separation.

The collar 34 is capable of axial displacement on body 16 between a latching position as shown in FIG. 1, and a release position as shown in FIG. 2. The collar is biased toward the latching position by a plurality of spring washers 48, such as wave or Belleville washers, interposed between radial collar portion 38, and radial shoulder 50 defined upon body 16. Thus, the collar 34 will be maintained in the position of FIG. 1 by the washers 48 under normal conditions.

The radial positioning of the ball detents 44 is regulated by the latching sleeve 52 axially displaceable upon collar 34, and biased toward the right by compression spring 54 interposed between sleeve radial surface 56 and the body radial shoulder 58. Movement of the sleeve to the right is limited by engagement of the drive wire 60 with the body shoulder 62. The sleeve 52 includes an inner cylindrical surface 64 adapted to overlie the balls 44 as shown in FIG. 1 maintaining the ball detents within the male coupling part groove, and an annular recess 66 defined adjacent the surface 64, when radially aligned with the ball detents, permits the ball detents to radially move outwardly within the openings 42, in the normal manner. The sleeve 52 may be manually shifted from the latching position shown in FIG. 1 to a position wherein recess 66 is in radial alignment with the ball detents 44, constituting a release position of the sleeve.

The male part 12 includes a passage 68 internally threaded at 70 for attachment with a conduit system, such as a hose fitting, and valve 72 pivotally mounted within passage 68 functions as a check valve to pivot into a sealed relationship with radial valve seat 74 upon the coupling parts being disconnected. Under flow conditions the valve 72 will be maintained in the open position shown in the drawing by the flow of fluid through the coupling toward the right.

The body part 12 includes a nose 76 axially extending to the left having an exterior cylindrical surface 78 which sealingly cooperates with the O-ring 32 as the coupling parts are connected. During coupling the nose 76 enters the valve elements' recesses 30 pivoting the valve elements to the open position of FIG. 1.

Exteriorly, the part 12 is provided with an annular elastomer bumper 80 for protecting the part if dropped to the ground and an annular locking groove 82 having a circular cross sectional configuration substantially corresponding to that of the ball detents 44.

In operation, the parts 10 and 12 are axially aligned and brought toward each other inserting the nose 76 into the recess 24. Upon engagement of the nose with the valve elements' recesses 30 the valves 26 begin to pivot to an open position, and as a sealing connection has been made between surface 78 and O-ring 32 no leakage will occur during this phase of the coupling procedure. As coupling continues, the operator will shift the latching sleeve 52 toward the left to align the recess 66 with the ball detents 44, permitting the balls to enter the recess as pushed outwardly by part 12. When detents 44 radially align with groove 82 the operator releases the sleeve 52 against the biasing force of spring 54 radially aligning the sleeve surface 64 with the detents forcing the detents into the groove 82 and completing the coupling operation. As the ball detents are now restrained against both axial and radial movement relative axial movement between the coupling parts 10 and 12 is prevented.

If the coupling parts 10 and 12 are subjected to high tension forces, such as would occur if the coupling was used with a tanker truck or ship, and a flexible hose associated with the coupling is excessively tensioned, such a force will tend to displace the collar 34 toward the right relative to body 10, and upon the biasing force imposed upon the collar by the spring washers 48 being overcome a relative axial displacement between collar 34 and body 10 occurs. Such axial displacement can be sufficient to radially align the ball detents 44 with the latch sleeve recess 66 permitting the detents to be forced from the groove 82 into recess 66 and permitting the coupling parts to separate, with their associated valves immediately closing. Thus, it will be appreciated that axial forces upon the coupling parts substantially parallel to the axis of the parts will permit an automatic uncoupling of the parts upon the biasing force imposed by the spring washers 48 on the collar 34 being overcome.

Under normal conditions the coupling parts will be manually released, and such operation is readily accomplished by shifting the latching sleeve 52 to the left to align recess 66 with ball detents 44, which permits coupling parts to be readily separated.

The fluid pressures acting upon the coupling parts 10 and 12, when coupled, are determined by the area of the radial surfaces exposed to the internal fluid pressure, and such radial pressure faces as defined upon the respective parts are of substantially equal area whereby even high fluid pressure within the coupling does not produce tension forces within the coupling bodies tending to separate the coupling parts. Thus, internal fluid pressures do not aid or detract from the tension force necessary to shift collar 34 and automatically release the coupling parts, and likewise, such a balancing of the forces within the coupling parts assures ready manual operation of the latching sleeve 52 without requiring excessive forces.

As the collar 34 has little radial dimension its presence does not significantly add to the radial size of the coupling, and it will be appreciated from the drawings that the disclosed structure permits a relatively large diameter coupling and fluid passages to be defined in a coupling which is of an economical manufactureable form and simple in construction. The disclosed arrangement of components assures dependable operation under adverse conditions, and as the manual actuation of the latching sleeve 52 is widely used with fluid couplings no special skills on the part of the operator is required.

It is appreciated that various modifications to the inventive concepts of the invention will be apparent to those skilled in the art without departing from the spirit of the invention.

We claim:

1. A breakaway fluid coupling comprising, in combination, male and female body parts each having an axis, an axially extending passage, conduit attachment means in communication with the associated passage, a valve within the associated passage adapted to close upon the parts being uncoupled, a connection end, and latch means adapted to engage with the latch means defined on the other part for maintaining said parts in coupled intercommunication, said latch means defined on one part including a radially extending abutment surface facing said conduit attachment means of the associated part, a detent support axially slidably mounted on the other part between latched and release positions thereon, biasing means interposed between said other part and said detent support axially biasing said support toward said latched position, at least one radially displaceable detent mounted on said detent support adapted to engage said abutment surface upon said parts being coupled maintaining said parts coupled, detent positioning means defined on said other part having a first axial portion engaging said detent when said detent support is in said latched position maintaining said detent in engagement with said abutment surface and a second axial portion permitting radial displacement of said detent when said detent support is in said release position to disengage said detent and abutment surface and permit said parts to uncouple solely upon tension forces within said body parts compressing said biasing means to permit alignment of said second axial portion with said detent, and means supporting said detent positioning means on said other part having a normal condition restraining said detent positioning means against axial movement toward the associated connection end and permitting manual axial displacement away from said connection end whereby said detent positioning means may be manually axially displaced to disengage said detent and abutment surface.

2. A breakaway fluid coupling as in claim 1, said detent positioning means comprising an annular latch sleeve axially slidably mounted on said other part, said first axial portion comprising an inner cylindrical surface defined on said sleeve and said second axial portion comprising an annular recess defined in said sleeve, and a spring mounted on said part other biasing said sleeve in the axial direction to radially align said first axial portion with said detent.

3. In a breakaway fluid coupling as in claim 1, said detent support comprising an annular collar having an axially extending portion in which said detent is mounted and a radially extending portion engaging said biasing means, a plurality of radial openings defined in said axially extending portion circumferentially defined thereon at a given axial position thereon, said detents comprising a ball received within each opening.

4. In a breakaway fluid coupling as in claim 3, said biasing means comprising a plurality of annular spring washers coaxially mounted on said other part.

5. A breakaway fluid coupling comprising, in combination, male and female body parts each having an axis, an axially extending passage, conduit attachment means in communication with the associated passage, a valve within the associated passage adapted to close upon the parts being uncoupled, and a connection end, a cylindrical axially extending nose coaxially defined on said male part connection end, a coaxial recess defined in said female part connection end adapted to receive said nose, said female part valve being located within said recess and engaged by said nose upon said parts being coupled to open said engaged valve, a tubular collar mounted upon said female part for axial displacement thereon between latched and release positions, annular biasing means defined on said female part axially biasing said collar toward said latched position, a plurality of ball detents mounted in said collar for radial displacement thereto, an annular groove defined in said male part adapted to receive said ball detents upon said parts being coupled, a latch sleeve mounted on said female part for axial displacement thereon between latched and release positions, spring means biasing said sleeve toward its latched position, said sleeve including a ball detent engaging surface engaging said detents for selectively maintaining said detents within said groove and an annular recess releasing said detents upon said recess and detents being radially aligned, said parts having substantially equal area pressure forces subjected to internal pressures producing axial forces, said ball detents radially aligning with said sleeve recess by selective axial displacement of said collar or said latching sleeve relative to said female part from said respective latched to release positions.

6. In a breakaway fluid coupling as in claim 5, said annular biasing means comprising a plurality of spring washers.

* * * * *